(12) United States Patent
Schreck et al.

(10) Patent No.: US 11,715,493 B1
(45) Date of Patent: Aug. 1, 2023

(54) LONG-TERM SPACING COMPENSATION FOR HEAT ASSISTED MAGNETIC RECORDING

(71) Applicant: Western Digital Technologies, Inc., San Jose, CA (US)

(72) Inventors: Erhard Schreck, San Jose, CA (US); Karl Flechsig, Los Gatos, CA (US); Kenji Kuroki, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/830,941

(22) Filed: Jun. 2, 2022

(51) Int. Cl.
*G11B 5/54* (2006.01)
*G11B 21/08* (2006.01)
*G11B 5/00* (2006.01)

(52) U.S. Cl.
CPC ...... *G11B 21/08* (2013.01); *G11B 2005/0021* (2013.01)

(58) Field of Classification Search
CPC ......... G11B 5/54; G11B 5/607; G11B 5/6088; G11B 2005/0021; G11B 5/455; G11B 5/5547; G11B 21/085; G11B 5/6076; G11B 201/0388; G11B 5/012; G11B 5/6011; G11B 5/6027; G11B 5/0076; G11B 2005/0005; G11B 5/02; G11B 5/6064; G11B 2005/0013; G11B 5/3136
USPC .......................................................... 360/75
See application file for complete search history.

(56) References Cited

U.S. PATENT DOCUMENTS 8,619,508 B1     12/2013   Krichevsky et al.
9,311,943 B2      4/2016   Canchi et al.
9,786,310 B1 *   10/2017   Richter .................. G11B 5/455

* cited by examiner

*Primary Examiner* — Nabil Z Hindi
(74) *Attorney, Agent, or Firm* — Patent Law Works LLP

(57) ABSTRACT

Example systems, data storage devices, and methods to provide long-term spacing compensation for heat assisted magnetic recording are described. The data storage device includes a storage medium with data tracks and a head that can be positioned for reading and writing those tracks. The head includes a laser for heat assisted magnetic recording and a fly height actuator. Based on the operation of the laser, both a short-term fly height compensation parameter and a long-term fly height compensation parameter are determined based on different temperature state models. The operating power of the fly height actuator is determined, at least in part, based on the short-term and long-term height compensation parameters.

20 Claims, 9 Drawing Sheets

LONG-TERM SPACING COMPENSATION FOR HEAT ASSISTED MAGNETIC RECORDING

TECHNICAL FIELD

The present disclosure relates to data storage devices using heat assisted magnetic recording (HAMR). In particular, the present disclosure relates to compensation for laser-induced head protrusions in active fly height actuator (FHA) control schemes.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil of a write element to record magnetic transitions onto the disk surface in a process referred to as saturation recording. During readback, the magnetic transitions are sensed by a read element (e.g., a magnetoresistive element) and the resulting read signal is demodulated by a suitable read channel. Heat assisted magnetic recording (HAMR) is a more recent development that improves the quality of written data by heating the disk surface with a laser during write operations in order to decrease the coercivity of the magnetic medium, thereby enabling the magnetic field generated by the write coil to more readily magnetize the disk surface.

Data storage devices may be very sensitive to changes in spacing between the head and the surface of the storage medium. Increasing the distance reduces the strength and accuracy of the fields used to write and read, while decreasing the distance risks contact between the head and storage medium, which can have many undesirable consequences. Data storage devices have incorporated active fly height control that uses a fly height actuator to adjust the distance between the head and the storage medium. For example, fly height actuators may include heaters which control fly height through thermal expansion or piezoelectric (PZT) actuators which may deflect the head relative to the storage device when energized with a driving voltage.

The heat generated by the laser in data storage devices using HAMR may have a significant impact on the temperature of the head, changing the fly height characteristics of the system. There is a need for technology that provides improved fly height control in HAMR data storage devices.

SUMMARY

Various aspects for fly height control in HAMR data storage devices are disclosed, particularly the use of a long-term temperature state model to supplement a short-term temperature state model for spacing compensation.

One general aspect includes a data storage device that includes: a non-volatile storage medium that includes a plurality of data tracks; a head actuated over the non-volatile storage medium, where the head includes a laser configured to heat the non-volatile storage medium while writing data to the non-volatile storage medium and a fly height actuator configured to adjust a fly height of the head over the non-volatile storage medium; and control circuitry. The control circuitry is configured to: position the head over a target track of the plurality of data tracks; determine, based on operation of the laser, a first fly height compensation parameter corresponding to a first temperature state model; determine, based on the operation of the laser, a second fly height compensation parameter corresponding to a second temperature state model; and determine, based on the first fly height compensation parameter and the second fly height compensation parameter, operating power of the fly height actuator.

Implementations may include one or more of the following features. The first temperature state model may be configured to track laser-induced heating in a first time range below a time cutoff value and the second temperature state model may be configured to track laser-induced heating in a second time range that extends above the time cutoff value. The non-volatile storage medium may include a rotating disk; and the time cutoff value may not be greater than one revolution of the rotating disk. The first temperature state model may be further configured to: determine an elapsed time since the laser was active; and responsive to the elapsed time reaching the time cutoff value, set the first fly height compensation parameter to a default value. The first temperature state model may include a first time constant configured to determine changes in the first fly height compensation parameter, the second temperature state model may include a second time constant configured to determine changes in the second fly height compensation parameter, and the first time constant may be less than the second time constant. The second time constant may be at least twice the first time constant. The control circuitry may be further configured to evaluate a fly height control model to determine the operating power of the fly height actuator, the fly height control model may be based on a plurality of fly height compensation parameters, and the plurality of fly height compensation parameters may include the first fly height compensation parameter for laser-induced heating and the second fly height compensation parameter for laser-induced heating. The control circuitry may be further configured to determine at least one additional fly height compensation parameter of the plurality of fly height compensation parameters, and the at least one additional fly height compensation parameters may be selected from: a servo signal value; a data storage device temperature state; and write pole tip protrusion state. The plurality of data tracks may include of a plurality of data sectors and the control circuitry may be further configured to update the first fly height compensation parameter and the second fly height compensation parameter on a per data sector basis. The control circuitry may be further configured to: determine whether the laser is active to heat the non-volatile storage medium; responsive to the laser being active to heat the non-volatile storage medium, determine whether laser-induced protrusion is greater than a current protrusion value; responsive to the laser-induced protrusion being greater than the current protrusion value: selectively calculate, using the first temperature state model, a first heating change value; selectively update, based on the first heating change value, the first fly height compensation parameter; selectively calculate, using the second temperature state model, a second heating change value; and selectively update, based on the second heating change value, the second fly height compensation parameter; and responsive to the laser-induced protrusion being less than the current protrusion value: selectively calculate, using the first temperature state model, a first cooling change value; selectively update, based on the first cooling change value, the first fly height compensation parameter; selectively calculate, using the second temperature state model, a second cooling change value; and selectively update, based on the second cooling change value, the second fly height compensation parameter. The control circuitry may be further configured to: determine whether the laser is not active to heat the non-volatile storage medium; and responsive to the laser not being active to heat the non-volatile storage medium: selectively calculate, using the first temperature state model, a first cooling change value; selectively update, based on the first cooling change value, the first fly height compensation parameter; selectively calculate, using the second temperature state model, a second cooling change value; and selectively update, based on the second cooling change value, the second fly height compensation parameter.

Another general aspect includes a method that includes: positioning a head over a target track of a plurality of data tracks on a non-volatile storage medium; selectively heating, using a laser in the head, the non-volatile storage medium while writing data to the non-volatile storage medium; and adjusting, using a fly height actuator, a fly height of the head over the non-volatile storage medium; determining, based on operation of the laser, a first fly height compensation parameter corresponding to a first temperature state model; determining, based on the operation of the laser, a second fly height compensation parameter corresponding to a second temperature state model; and determining, based on the first fly height compensation parameter and the second fly height compensation parameter, operating power of the fly height actuator to adjust the fly height.

Implementations may include one or more of the following features. The method may include: tracking, using the first temperature state model, laser-induced heating in a first time range below a time cutoff value; and tracking, using the second temperature state model, laser-induced heating in a second time range that extends above the time cutoff value. The method may include: determining, for the first temperature state model, an elapsed time since the laser was active; and responsive to the elapsed time reaching the time cutoff value, setting the first fly height compensation parameter to a default value. The method may include: determining, using a first time constant for the first temperature state model, changes in the first fly height compensation parameter; and determining, using a second time constant for the second temperature state model, changes in the second fly height compensation parameter, where the first time constant is less than the second time constant. The method may include: determining at least one additional fly height compensation parameter selected from a servo signal value, a data storage device temperature state, and write pole tip protrusion state; and evaluating a fly height control model to determine the operating power of the fly height actuator, where the fly height control model is based on at least the first fly height compensation parameter for laser-induced heating, the second fly height compensation parameter for laser-induced heating, and the at least one additional fly height compensation parameter. The method may include updating the first fly height compensation parameter and the second fly height compensation parameter on a per data sector basis, where the plurality of data tracks includes a plurality of data sectors. The method may include: determining whether the laser is active to heat the non-volatile storage medium; responsive to the laser being active to heat the non-volatile storage medium, determining whether laser-induced protrusion is greater than a current protrusion value; responsive to the laser-induced protrusion being greater than the current protrusion value: selectively calculating, using the first temperature state model, a first heating change value; selectively updating, based on the first heating change value, the first fly height compensation parameter; selectively calculating, using the second temperature state model, a second heating change value; and selectively updating, based on the second heating change value, the second fly height compensation parameter; and responsive to the laser-induced protrusion being less than the current protrusion value: selectively calculating, using the first temperature state model, a first cooling change value; selectively updating, based on the first cooling change value, the first fly height compensation parameter; selectively calculating, using the second temperature state model, a second cooling change value; and selectively updating, based on the second cooling change value, the second fly height compensation parameter. The method may include: determining whether the laser is not active to heat the non-volatile storage medium; and responsive to the laser not being active to heat the non-volatile storage medium: selectively calculating, using the first temperature state model, a first cooling change value; selectively updating, based on the first cooling change value, the first fly height compensation parameter; selectively calculating, using the second temperature state model, a second cooling change value; and selectively updating, based on the second cooling change value, the second fly height compensation parameter.

Still another general aspect includes a data storage device that includes: a non-volatile storage medium including a plurality of data tracks; a head actuated over the non-volatile storage medium, where the head includes a laser configured to heat the non-volatile storage medium while writing data to the non-volatile storage medium and a fly height actuator configured to adjust a fly height of the head over the non-volatile storage medium; means for positioning the head over a target track of the plurality of data tracks; means for determining, based on operation of the laser, a first fly height compensation parameter corresponding to a first temperature state model; means for determining, based on the operation of the laser, a second fly height compensation parameter corresponding to a second temperature state model; and means for determining, based on the first fly height compensation parameter and the second fly height compensation parameter, operating power of the fly height actuator.

The present disclosure describes various aspects of innovative technology capable of improving fly height control for HAMR data storage devices. The various embodiments include operations and control circuitry to overcome or at least reduce issues previously encountered in HAMR data storage devices and, accordingly, are more reliable than other HAMR data storage devices. That is, the various embodiments disclosed herein include hardware and/or software with functionality to improve active fly height control during storage operations, such as by using a long-term temperature state model based on operation of the laser to generate fly height compensation parameters for controlling the fly height actuator. Accordingly, the embodiments disclosed herein provide various improvements to HAMR data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Figure 1B:
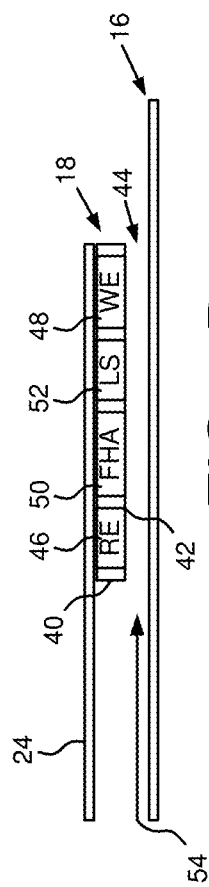
FIG. 1B is a diagram of an example HAMR head actuated over the disk surface.
Figure 1A:
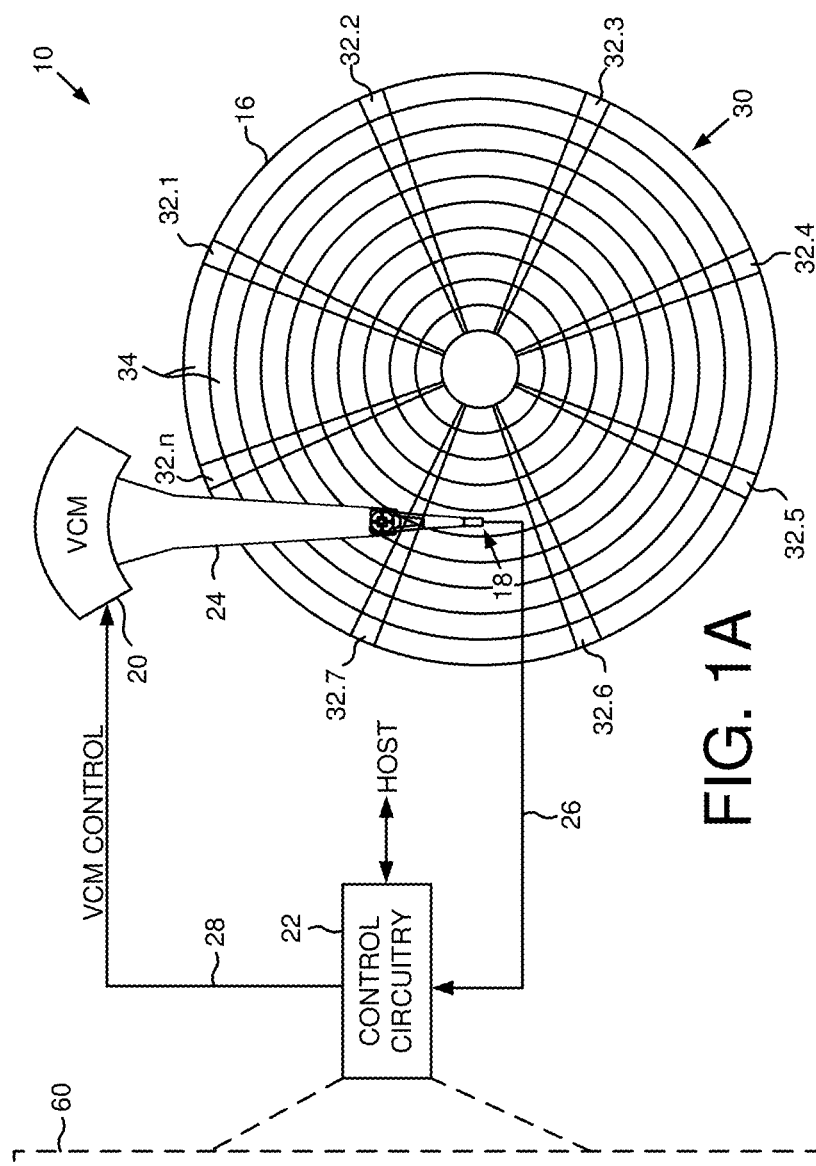
FIG. 1A is a diagram of an example data storage device in the form of a disk drive comprising a head actuated over a disk surface.

FIGS. 1A and 1B show a data storage device 100 in the form of a disk drive according to an embodiment comprising at least one disk surface 16 as a non-volatile storage medium. Disk surface 16 comprises a plurality of data tracks 34 defined by servo sectors 32.1-32.$n$ according to a disk format 30, where each data track comprises a plurality of data sectors. At least one head 18 is actuated over the rotating disk surface 16 by an actuator 20 for reading data from and writing data to disk surface 16. In some configurations, actuator 20 may include a voice coil motor (VCM) and actuator arm 24, including one or more actuator stages. For example, an actuator may include a VCM stage for gross positioning and one or more additional motor controls for fine positioning of the heads at different scales, such as a milli-controller stage, a micro-controller stage, etc.

In the configuration shown in FIG. 1B, head 18 is comprised of a slider body 40 and has an air bearing surface 42 parallel to disk surface 16 and separated by an air gap 44. Head 18 may be supported over the disk by actuator arm 24 and attached by a gimbal assembly. The distance from disk surface 16 to air bearing surface 42 may correspond to the fly height of head 18, subject to protrusions by one or more head elements from air bearing surface 42, which may reduce the effective fly height of head 18. In the configuration shown, head 18 includes a read element 46 and write element 48 configured for reading from and writing to disk surface 16.

Head 18 also include a fly height actuator 50 configured for fine adjustment of the fly height, for example, on a nanometer scale. Fly height actuator 50 may be operable to adjust the fly height of head 18 over disk surface 16 based on a control signal from control circuitry 22. Fly height actuator 50 may include any suitable powered actuator, such as a heater which controls the fly height through thermal expansion or a piezoelectric (PZT) actuator which may deflect toward the disk when energized by a driving voltage. Fly height actuator 50 may be controlled to maintain head 18 at a target fly height during read and write operations. When not performing read/write operations, fly height actuator 50 may be controlled to increase the fly height of the head so as to avoid or reduce collisions with asperities on the disk.

Head 18 may include a laser 52 operable to heat disk surface 16 during write operations. For example, laser 52 may heat disk surface 16 ahead of write element 48 to lower the coercivity of the magnetic material in the storage medium as the write field is applied. Arrow 54 shows the direction of rotation of the disk relative to head 18. Laser 52 may be any suitable laser for heating disk surface 16, such as a laser diode, and may include additional features to assist in focusing the laser on the desired heating location on disk surface 16, such as waveguides, focusing lenses, or similar elements. Laser 52 may be controlled by control circuitry 22.

Figure 1C:
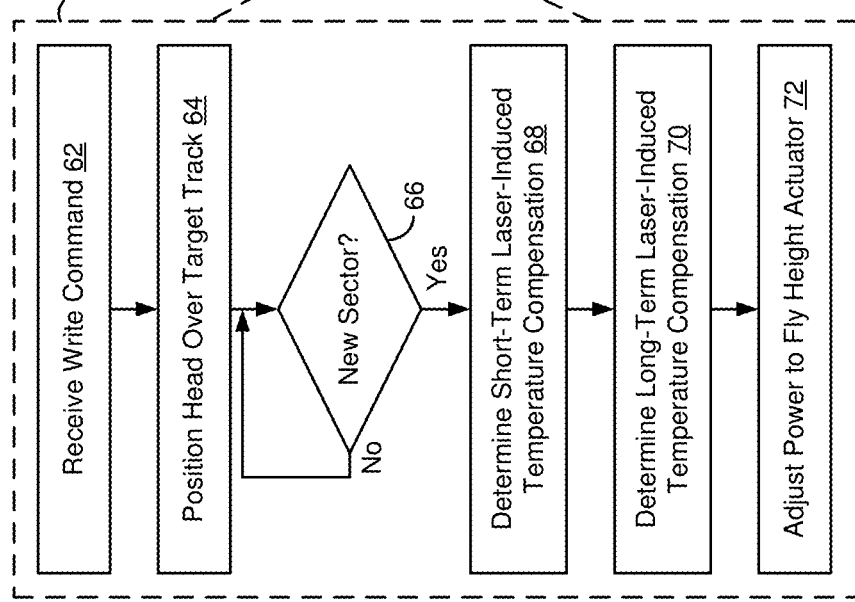
FIG. 1C is a flow diagram of an example method for fly height compensation that may be implemented in the control circuitry of FIG. 1A for the HAMR head configuration of FIG. 1B.

Data storage device 100 further comprises control circuitry 22 configured to execute the flow diagram of FIG. 1C for controlling fly height with laser-induced temperature compensation. Spacing changes may be caused by the operation of laser 52 on head 18 during HAMR recording. Heat generated by laser 52 may distort slider body 40, which affects the air-bearing between head 18 and disk surface 16 and may cause spacing changes for read element 46 and write element 48. Spacing may be adjusted using thermal fly height control heater(s), such as fly height actuator 50. Fly height may be controlled using a feed-forward scheme, rather than a real-time spacing measurement. For example, spacing change versus laser usage may be pre-characterized during the manufacturing process. The resulting laser-induced temperature compensation models may be embodied in software and/or hardware controls, such as filters using multiple exponential time constants or other mathematically-based filters. These models and corresponding filters can be used to compute heating and cooling states for an active head. For example, heating and cooling states may be calculated on a per sector basis and stored each revolution for use during the next revolution, regardless of head switching. Upon seek set up for a next operation, any cooling may be calculated and the new filter states for the new active head may be passed to the fly height controller. The fly height controller may determine the power signal to be sent to the fly height actuator.

In some configurations, control circuitry 22 may include on-board electronics comprising one or more systems on a chip (SOC), application-specific integrated circuits (ASICs), and/or other data or signal processing components attached to a printed circuit board assembly (PCBA) and/or other interconnects (such as the flex connector to the actuators). Control circuitry 22 may include circuits, processors, memory devices, and software or firmware executed therein for completing various data and signal processing tasks, including control of actuator 20, read-write operations through head 18, and rotation of disk surface 16 by a spindle motor (not shown). In some embodiments, control circuitry may include distinct servo control, fly height control, laser control, read/write channel paths for actuator 20, head 18 and disk surface 16 (and data written thereon).

As shown in FIG. 1C, control circuitry 22 may include firmware configured to execute an example method 60 for fly height compensation for the HAMR head configuration in FIG. 1B. The method in FIG. 1C is described from the perspective of controlling write operations through head 18 on actuator 20 to disk surface 16.

At block 62, a write command may be received for a target data track 34 on disk surface 16. For example, control circuitry 22 may receive or generate a write command targeting data blocks to be stored on disk surface 16.

At block 64, head 18 may be positioned over the target data track. For example, control circuitry 22 may use a servo controller and feedback from servo sectors 32 to move actuator 20 and position head 18 over the target data track for a write operation.

At block 66, whether a new sector has been detected may be determined. For example, the servo controller may determine when a next servo sector has passed beneath head 18, determine the sector identifier for that sector, and update the current sector identifier for use by other components of control circuitry 22. If a new sector is detected, then the remainder of method 60 continues at block 68-72 to adjust the fly height for that sector. If no new sector is detected, then method 60 waits until a new sector is detected and adjusts fly height on a per sector basis.

At block 68, short-term laser-induced temperature compensation may be determined. For example, control circuitry 22 may determine a laser-induced fly height compensation state based on a short time constant proximate 1-10 sectors or less than a millisecond. In some configurations, sector time may be less than 10 microseconds. Short-term laser-induced temperature compensation may compensate for the direct impact of powering up and emitting a laser pulse from laser 52.

At block 70, long-term laser induced temperature compensation may be determined. For example, control circuitry 22 may determine a laser-induced fly height compensation state based on a long time constant proximate one or more revolutions or greater than a millisecond. In some configurations, revolution time may be greater than 2 milliseconds and no greater than 50 milliseconds. Long-term laser-induced temperature compensation may compensate for the heat memory of slider body 40 and elements thereof, including laser 52.

Figure 2A:
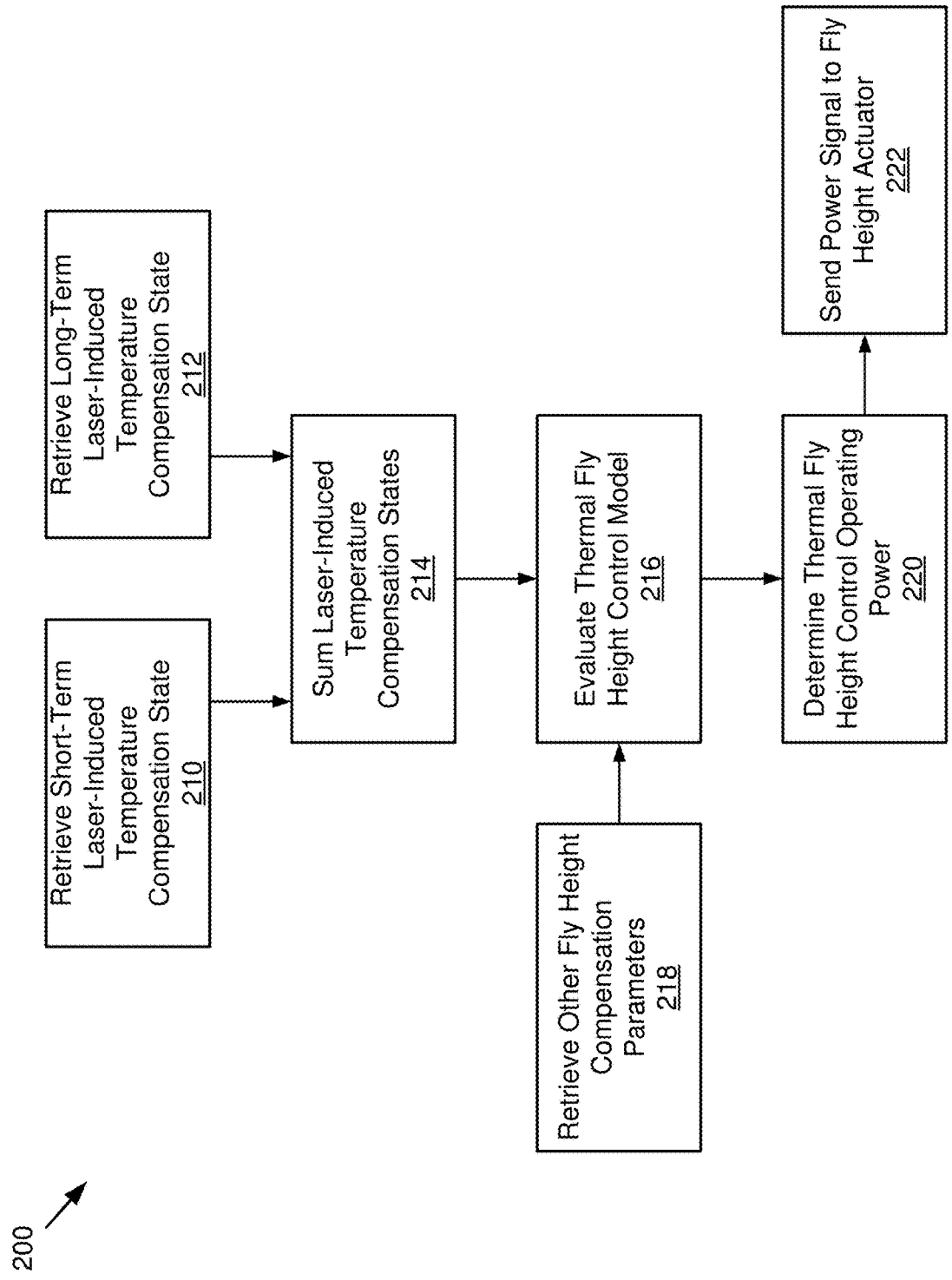
FIG. 2A is an example method of adjusting fly height based on short-term and long-term laser-induced temperature compensation.
Figure 2B:
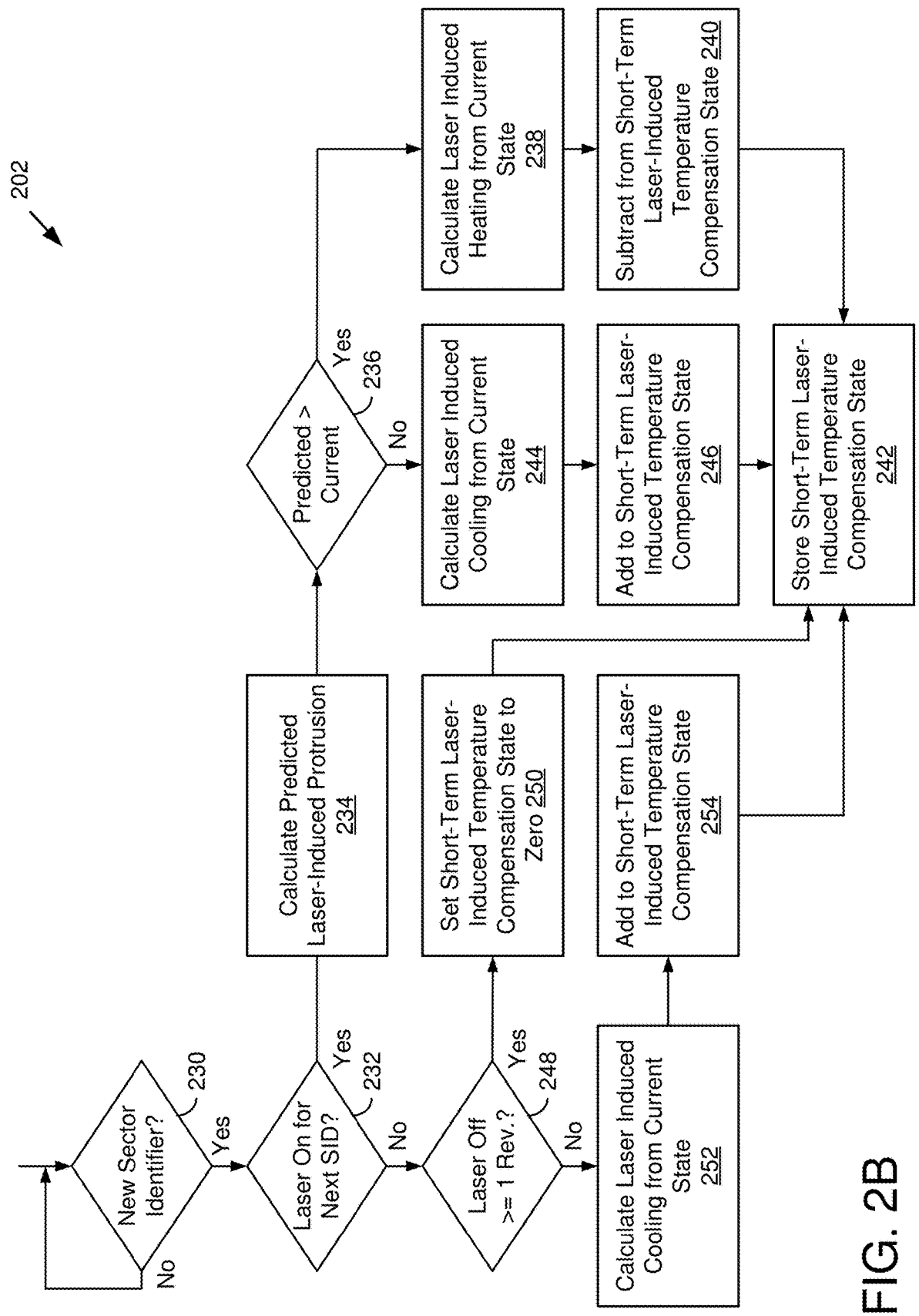
FIG. 2B is an example method of determining a short-term laser-induced temperature compensation state.
Figure 2C:
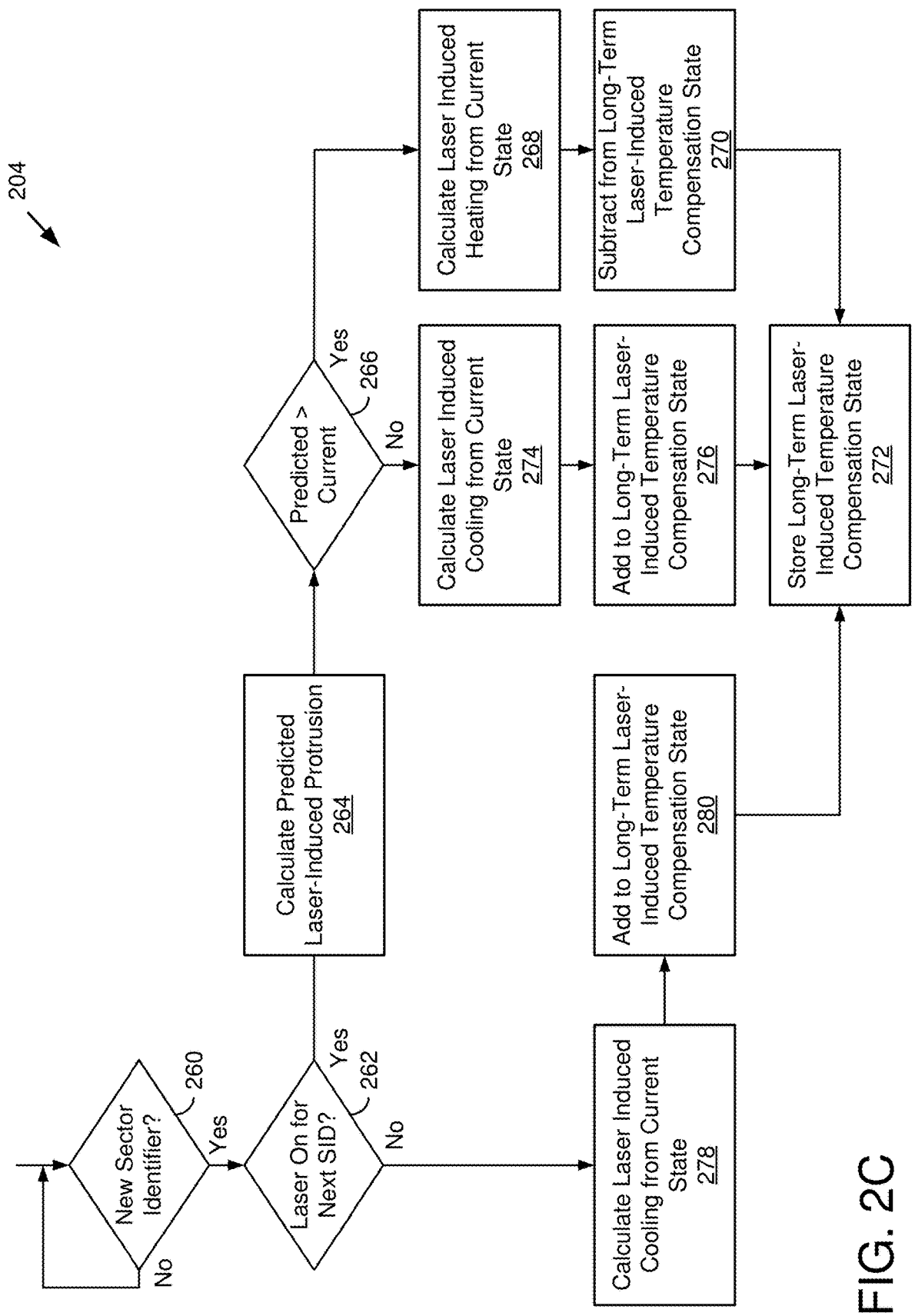
FIG. 2C is an example method of determining a long-term laser-induced temperature compensation state.

FIGS. 2A, 2B, and 2C show a more detailed example method of controlling fly height based on short-term and long-term laser-induced temperature compensation. FIG. 2A shows an example method 200 of adjusting fly height using the laser-induced temperature compensation states of determined by the method 202 of FIG. 2B and method 204 of FIG. 2C. In some configurations, more than two laser-induced temperature compensation states and corresponding state machine may be used to model more than two heating and cooling factors and corresponding time constants and each laser-induced temperature compensation state may be calculated by methods similar to FIG. 2B and/or FIG. 2C.

At block 210, a short-term laser-induced temperature compensation state may be retrieved. For example, a fly height controller may read a fly height compensation state value from a memory location allocated for receiving the value from a short-term laser-induced temperature state model that is evaluated and updated periodically, such as on a per sector basis.

At block 212, a long-term laser-induced temperature compensation state may be retrieved. For example, the fly height controller may read another fly height compensation state value from another memory location allocated for receiving the value from a long-term laser induced temperature state model that is also evaluated and updated periodically, such as on a per sector basis.

At block 214, the laser-induced temperature compensation states may be summed. For example, the two fly height compensation state values from their respective memory locations may be added together or combined through some other function to determine a total laser-induced compensation state value.

At block 216, a thermal fly height control model may be evaluated. For example, the fly height controller may include a fly height control model used to determine the state change for the total thermal fly height compensation and use the total laser-induced compensation state value as part of that calculation. In some configurations, laser-induced temperature changes may not be the only factors or parameters used for evaluating the thermal fly height compensation state and additional parameters may be retrieved at block 218.

At block 218, other fly height compensation parameters may be retrieved. For example, the fly height controller may read other fly height compensation state values or other parameter values from corresponding memory locations, such as servo parameters, temperature sensor parameters, or write pole tip protrusion (PTP) parameters.

At block 220, a thermal fly height control operating power may be determined. For example, the fly height controller may use a new predicted fly height state and/or difference from a current fly height state to determine a power value or change in power value for driving one or more thermal heater elements in the slider body.

At block 222, a power signal may be sent to the fly height actuator. For example, the fly height controller may send a control signal with a desired power value to the head to adjust the fly height, such as by increasing or decreasing the power to one or more heaters in the slider body.

FIG. 2B shows an example method 202 for determining a short-term laser-induced temperature compensation state. FIG. 2B may be used to generate and store the short-term laser induced temperature compensation state retrieved by the fly height controller at block 210 in FIG. 2A.

At block 230, whether or not a new sector identifier has been determined may be evaluated. For example, one or more laser-induced temperature compensation state machines may monitor a sector timer for an indication that a new servo sector has been read, generating a new sector identifier. If yes, method 202 proceeds to block 232. If no, method 202 continues to monitor the sector timer until a new sector is indicated.

At block 232, whether or not the laser will be used in the next sector may be determined. For example, the laser-induced temperature compensation state machines may determine whether a HAMR write operation is starting or continuing in the next sector. If yes, method 202 may proceed to block 234. If no, method 202 may proceed to block 248.

At block 234, a predicted laser-induced protrusion may be calculated. For example, the laser-induced temperature compensation state machines may include a mathematical, circuit-based, and/or lookup table model for determining expected protrusion based on characterization of the head response to laser operation. In some configurations, the number of pulses, percentage of laser operation over the length of the sector, or similar values may be used to for predicting the laser-induced protrusion.

At block 236, whether or not the predicted protrusion value is expected to be greater than a current protrusion value may be determined. For example, the laser-induced temperature compensation state machines may store the current protrusion from the predicted protrusion of the prior sector and compare the protrusion value calculated at block 234 to the stored value. If the predicted protrusion is greater, then method 202 may proceed to block 238. If the predicted protrusion is not greater, then method 202 may proceed to block 244.

At block 238, laser-induced heating may be calculated from the current state. For example, the laser-induced compensation state machine for short-term fly height compensation may use a short time constant, on the order of 1-3 sectors, to determine a delta short-term laser-induced temperature compensation value.

At block 240, the delta value determined at block 238 may be subtracted from the short-term laser-induced temperature compensation state. For example, the short-term laser-induced compensation state machine may reduce its compensation state to reflect the increased heating and predicted protrusion—less heat should be applied by the fly height heater to compensate for laser-induced heating.

At block 242, the short-term laser-induced temperature compensation state may be stored. For example, the short-term laser-induced temperature compensation state machine may store an updated state value to a storage location accessible by the fly height controller.

At block 244, laser-induced cooling may be calculated from the current state. For example, the laser-induced compensation state machine for short-term fly height compensation may use the short time constant to determine a delta short-term laser-induced temperature compensation value. Where no change in protrusion is predicted, the calculated laser-induced cooling (or heating) may be zero and whether the path through block 244 or block 236 is followed, the resulting short-term laser-induced temperature compensation state stored at block 242 may be the same.

At block 246, the delta value determined at block 244 may be added to the short-term laser-induced temperature compensation state. For example, the short-term laser-induced compensation state machine may increase its compensation state to reflect the decreased heating and predicted protrusion—more heat should be applied by the fly height heater to compensate for laser-induced cooling. Even though the cooling is the result of less operation of the laser and resulting heat dissipation, it is still referred to as laser-induced cooling as it is part of the overall calculation and modeling of laser-induced heating.

At block 248, whether the laser has been off for greater than or equal to one revolution may be determined. For example, the short-term laser-induced compensation state machine may include a time cutoff value, such as one revolution, for returning the short-term laser-induced temperature compensation state to a default value. If the time cutoff value is met, method 202 may proceed to block 250. If the time cutoff value is not met, method 202 may proceed to block 252. In some configurations, time may be measured using counts of sectors or revolutions, rather than relying on a separate time-based clock.

At block 250, the short-term laser-induced temperature compensation state may be set to zero. For example, the short-term laser-induced compensation state machine may include a default value, such as zero, and reset the state value to that default once the time cutoff value is met.

At block 252, laser-induced cooling may be calculated from the current state. For example, the laser-induced compensation state machine for short-term fly height compensation may use the short time constant to determine a delta short-term laser-induced temperature compensation value during sectors where the laser is not in operation.

At block 254, the delta value determined at block 252 may be added to the short-term laser-induced temperature compensation state. For example, the short-term laser-induced compensation state machine may increase its compensation state to reflect the decreased heating and predicted protrusion—more heat should be applied by the fly height heater to compensate for laser-induced cooling as heat from the laser dissipates during sectors when the laser is off.

FIG. 2C shows an example method 202 for determining a long-term laser-induced temperature compensation state. FIG. 2C may be used to generate and store the long-term laser induced temperature compensation state retrieved by the fly height controller at block 212 in FIG. 2A.

At block 260, whether or not a new sector identifier has been determined may be evaluated. For example, one or more laser-induced temperature compensation state machines may monitor a sector timer for an indication that a new servo sector has been read, generating a new sector identifier. If yes, method 204 proceeds to block 262. If no, method 204 continues to monitor the sector timer until a new sector is indicated.

At block 262, whether or not the laser will be used in the next sector may be determined. For example, the laser-induced temperature compensation state machines may determine whether a HAMR write operation is starting or continuing in the next sector. If yes, method 204 may proceed to block 264. If no, method 204 may proceed to block 278.

At block 264, a predicted laser-induced protrusion may be calculated. For example, the laser-induced temperature compensation state machines may include a mathematical, circuit-based, and/or lookup table model for determining expected protrusion based on characterization of the head response to laser operation.

At block 266, whether or not the predicted protrusion value is expected to be greater than a current protrusion value may be determined. For example, the laser-induced temperature compensation state machines may store the current protrusion from the predicted protrusion of the prior sector and compare the protrusion value calculated at block 364 to the stored value. If the predicted protrusion is greater, then method 204 may proceed to block 268. If the predicted protrusion is not greater, then method 204 may proceed to block 274.

At block 268, laser-induced heating may be calculated from the current state. For example, the laser-induced compensation state machine for long-term fly height compensation may use a long time constant, on the order of 1 or more revolutions, to determine a delta long-term laser-induced temperature compensation value.

At block 270, the delta value determined at block 268 may be subtracted from the long-term laser-induced temperature compensation state. For example, the long-term laser-induced compensation state machine may reduce its compensation state to reflect the increased heating and predicted protrusion—less heat should be applied by the fly height heater to compensate for laser-induced heating.

At block 272, the long-term laser-induced temperature compensation state may be stored. For example, the long-term laser-induced temperature compensation state machine may store an updated state value to a storage location accessible by the fly height controller.

At block 274, laser-induced cooling may be calculated from the current state. For example, the laser-induced compensation state machine for long-term fly height compensation may use the long time constant to determine a delta long-term laser-induced temperature compensation value. Where no change in protrusion is predicted, the calculated laser-induced cooling (or heating) may be zero and whether the path through block 274 or block 266 is followed, the resulting long-term laser-induced temperature compensation state stored at block 272 may be the same.

At block 276, the delta value determined at block 274 may be added to the long-term laser-induced temperature compensation state. For example, the long-term laser-induced compensation state machine may increase its compensation state to reflect the decreased heating and predicted protrusion—more heat should be applied by the fly height heater to compensate for laser-induced cooling.

At block 278, laser-induced cooling may be calculated from the current state. For example, the laser-induced compensation state machine for long-term fly height compensation may use the long time constant to determine a delta long-term laser-induced temperature compensation value during sectors where the laser is not in operation.

At block 280, the delta value determined at block 252 may be added to the long-term laser-induced temperature compensation state. For example, the long-term laser-induced compensation state machine may increase its compensation state to reflect the decreased heating and predicted protrusion—more heat should be applied by the fly height heater to compensate for laser-induced cooling as heat from the laser dissipates during sectors when the laser is off.

Figure 3:
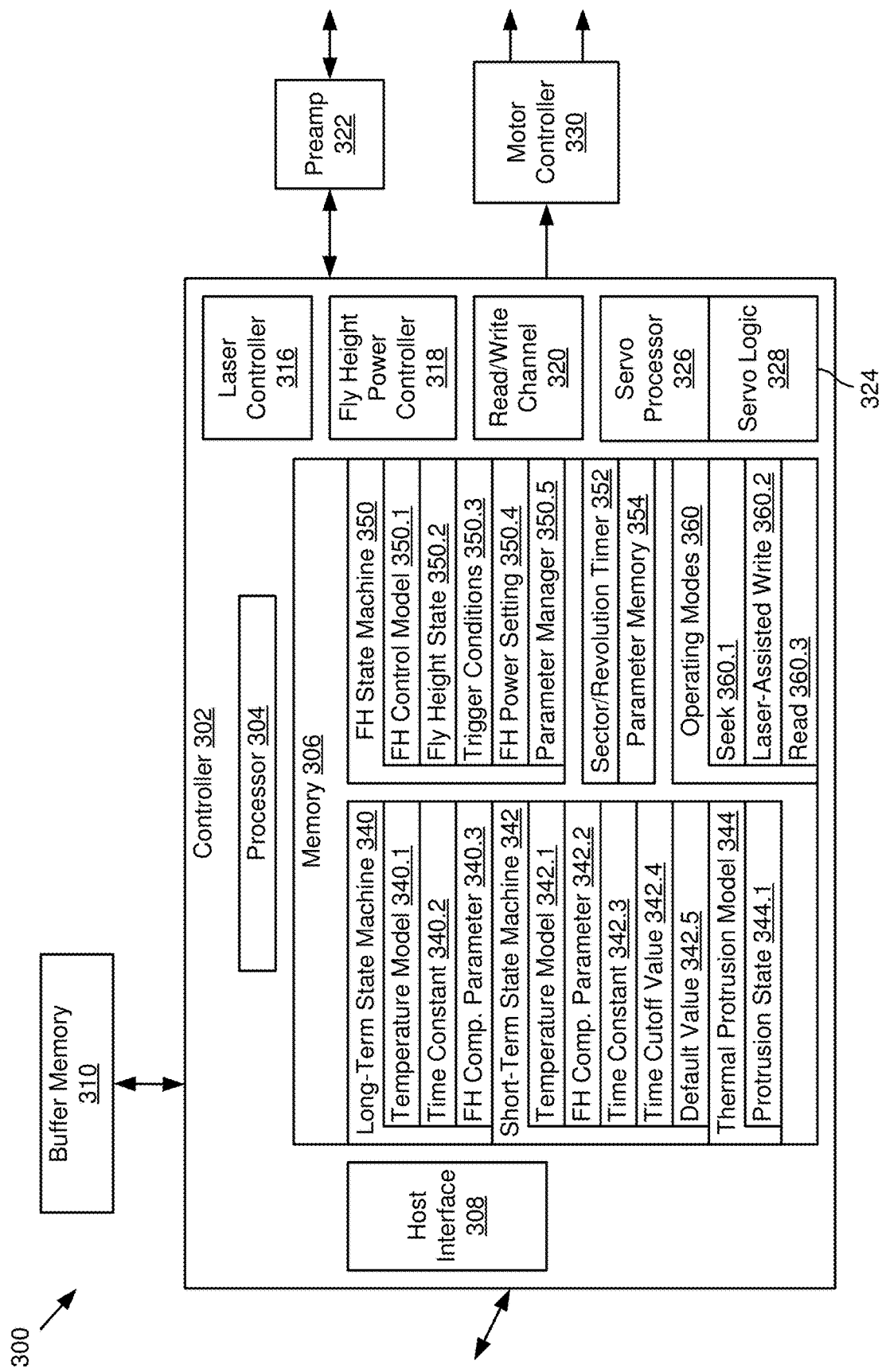
FIG. 3 is a block diagram of a configuration of data storage device electronics for fly height compensation in a HAMR data storage device.

FIG. 3 shows a portion of example control circuitry 300 for a HAMR data storage device, such as the disk drive of FIGS. 1A-1C. In the example shown, control circuitry 300 may include one or more controllers 302. Controller 302 may comprise a storage device controller configured to receive host storage commands, process storage operations for writing, reading, and managing data stored to non-volatile storage media in the disk drive, such as the magnetic media disks in FIGS. 1A and 1B.

Controller 302 may comprise a processor 304, a memory 306, a host interface 308, and access to a buffer memory 310. Controllers 302 may also comprise a laser controller 316, a fly height power controller 318, a read/write channel 320, and a servo controller 324 including a servo processor 326 and servo logic 328. In some embodiments, one or more of host interface 308, laser controller 316, fly height power controller 318, read/write channel 320, and servo controller 324 may be embodied in separate packages, such as ASICs, SOCs, or other specialized circuits that interface with processor 304 and memory 306 for carrying out their respective functions. Controller 302 may include physical and electrical interfaces for connecting to buffer memory 310, preamp 322, motor controller 330, other controllers, and/or other circuitry components. In some embodiments, the components of controller 302 may be interconnected by a bus that includes one or more conductors that permit communication among the components. For example, processor 304, memory 306, host interface 308, laser controller 316, fly height power controller 318, read/write channel 320, and/or servo controller 324 may be components attached to a PCBA that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store firmware instructions comprising one or more modules or sub-modules for specific data storage device operations and processor 304 may execute those instructions, including controlling communication with other components, such as host interface 308, buffer memory 310, laser controller 316, fly height power controller 318, read/write channel 320, and servo controller 324.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces of the storage device.

Laser controller 316 may include a power controller and related logic in a specialized circuit for controlling the operation of a laser, such as a laser diode in the head of a HAMR data storage device. For example, laser controller 316 may regulate the power signal to the laser to turn the laser on and off. In some configurations, laser controller 316 may control multiple power settings determining the amount of power provided to the laser and resulting emissions of laser energy. In some configurations, laser controller 316 may control the laser to emit a pulse and laser controller parameters may determine the power, timing, frequency, and other characteristics of the pulse. In some configurations, a physical (wired) connection from laser controller 316 to the laser in the head may be provided through flex cable connection from controller 302 to the actuator supporting the head. In some configurations, laser controller 316 may provide an interface and set of commands and/or parameters that may be controlled by firmware stored in memory 306.

Fly height power controller 318 may include a power controller and related logic in a specialized circuit for controlling the operation of a fly height actuator, such as a thermal heater in the head of a data storage device with active fly height control. For example, fly height power controller 318 may regulate the power signal to the fly height actuator to determine the amount of heat generated by the fly height actuator to influence thermal expansion of the slider body and position of the air bearing surface and any protrusions. In some configurations, fly height power controller 318 control the power signal to a piezoelectric (PZT) fly height actuator that uses electrical signals to control the deformation of the fly height actuator, rather than manipulating thermal expansion. Even with a PZT fly height actuator, fly height may be adjusted to compensate for thermal changes in the head, such as laser-induced heating from the laser in a HAMR data storage device. Fly height power controller 318 may support a feedforward control model based on prior characterization of the head, head/disk interface, and response of the fly height actuator to various power settings for determining the fly height. In some configurations, fly height power controller 318 may provide an interface and set of commands and/or parameters that may be controlled by firmware stored in memory 306.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, write precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. Read/write channel 320 may provide the analog write signal to and receive the analog read signal from preamp 322, which controls and amplifies signals to and from the heads.

Servo controller 324 may include one or more specialized circuits configured to process servo data, such as position error signals, from the disk surfaces and providing a control signal to position the actuators in a closed-loop control system. Servo controller 324 may also receive commands from processor 304 for positioning operations, such as seek, track follow, load, unload, sweep, idle, and other actuator positioning operations. Servo controller 324 may also implement servo error recovery processes for recovering from servo errors. In some embodiments, servo controller 324 may include servo processor 326 and servo logic 328 (stored in a servo memory). For example, servo processor 326 may be a dedicated processor circuit and servo logic 328 may be firmware stored in RAM associated with the dedicated processor to provide dedicated computing resources for managing the servo functions. Servo controller 324 may provide servo control signals to motor controller 330 and motor controller 330 may control one or more actuator VCMs and/or a spindle motor for rotating the disk stack.

Control circuitry 300 may include a plurality of modules or subsystems that are stored and/or instantiated in memory 306 for execution by processor 304 as instructions or operations. For example, memory 306 may include a long-term laser-induced temperature state machine 340 configured for modeling the thermal influence of operation of the laser on a long time constant. Memory 306 may include a short-term laser induced temperature state machine 342 configured for modeling the thermal influence of operation of the laser on a short time constant. Memory 306 may include a thermal protrusion model configured to determine the protrusion state of a head for use by other modules, such as long-term laser-induced temperature state machine 340 and short-term laser-induced temperature state machine. Memory 306 may include a fly height state machine 350 configured to determine the power setting for fly height power controller 318 based on a feedforward model that correlates a number of compensation parameters with the power setting. Memory 306 may include a sector/revolution timer 352 configured to use servo sectors to provide timing information for other components. Memory 306 may include a parameter memory configured to store parameters, such as fly height compensation parameters, for use by other components. Memory 306 may include operating modes 360 configured to determine operating conditions for processing data operations through controller 302 for one or more heads.

Long-term laser-induced temperature state machine 340 (also referred to as long-term state machine 340) may include a set of functions, parameters, and data structures for determining the laser-induced temperature state for the long-term effects of laser-induced heating. For example, long-term state machine 340 may be configured to determine the heating and cooling of the head over multiple revolutions and hundreds or thousands of sectors. In some configurations, long-term state machine 340 may include a temperature model 340.1 configured to model temperature change based the periods of operation and when the laser is not operating. For example, temperature model 340.1 may increase a temperature state during periods of operation (up to a thermal saturation point), such as during HAMR write operations and decrease the temperature state during periods of non-operation, during servo sectors, read operations, seek operations, or when other heads are active in a multi-head data storage device. In some configurations, delta values may be determined every sector, such as every time a new sector identifier (SID) is determined from a servo sector.

An example temperature model 340.1 may be ((laser_history_nm1)+(% of laser on during SID)*(1_laser*Laser_nm/ma)*LTc1−laser_histor_nm1)*(1-exp(-1*SIDus/LTc1Amp), where laser_histor_nm1 is the prior SID's laser-induced fly height delta for the long time constant; % of laser on during SID is the amount of laser operation from SID-to-SID (not including servo bursts) as a percentage; 1_laser is laser power used during the SID; laser_nm/ma is the laser-induced fly height change at saturation or maximum; LTc1 is the laser-induced fly height change time constant for the long-term temperature model; LTc1_Amp is the time constant amplitude or the portion of the laser-induced fly height change allocated to this model and time constant (where the amplitudes for all models/time constants add up to 1). Temperature model 340.1 may include a long-term time constant 340.2 that determines the time scale on which temperature model 340.1 adjusts the fly height delta and may represent thermal properties of the head that are effectively modeled on that time scale. For example, a long-term temperature model may be configured with long-term time constant 340.2 substantially greater than 1-10 sectors and may be greater than one revolution. In some configurations, fly height compensation temperature model 340.1 may be embodied in firmware equations, a hardware circuit, and/or one or more lookup tables and long-term time constant 340.2 may include a value set by a firmware parameter value, filter/resistor/capacitor values, and/or a parameter value used in the configuration of a lookup table and its index values.

Long-term state machine 340 may determine and store (or otherwise output) a fly height compensation parameter 340.3 corresponding to the long-term temperature compensation state of long-term state machine 340. For example, rather than outputting a temperature state from long-term temperature model 340.1, the output may be determined as a delta fly height compensation value. Long-term state machine 340 may maintain fly height compensation parameter 340.3 in memory and adjust fly height compensation parameter 340.3 each sector based on the delta value output by long-term temperature model 340.1. For example, new current state may equal the prior current state minus the delta value from the temperature model. Fly height compensation parameter 340.3 may be configured to be the value added to the fly height adjustment value determined by fly height state machine 350. For example, an increase in protrusion according to temperature model 340.1 may result in fly height compensation parameter 340.3 going down (in nanometers) to represent a decrease in the amount of fly height compensation that should be generated by fly height state machine 350. Long-term state machine 340 may be configured to pass the current state value for long-term fly height compensation parameter 340.3 to fly height state machine 350 and/or store it in parameter memory 354 for retrieval by fly height state machine 350. In some configurations, a number of fly height compensation parameters for laser-induced temperature compensation models with varying time constants may be summed into a single fly height compensation parameter prior passing or storing.

Short-term laser-induced temperature state machine 342 (also referred to as short-term state machine 342) may include a set of functions, parameters, and data structures for determining the laser-induced temperature state for the short-term effects of laser-induced heating. For example, short-term state machine 342 may be configured to determine the heating and cooling of the head over 1-10 sectors and/or under a single revolution. In some configurations, short-term state machine 342 may include a temperature model 342.1 configured to model temperature change based the periods of operation and when the laser is not operating. For example, temperature model 342.1 may increase a temperature state during periods of operation (up to a thermal saturation point), such as during HAMR write operations and decrease the temperature state during periods of non-operation, during servo sectors, read operations, seek operations, or when other heads are active in a multi-head data storage device. In some configurations, delta values may be determined every sector, such as every time a new sector identifier (SID) is determined from a servo sector.

An example temperature model 342.1 may be ((laser_history_nm2)+(% of laser on during SID)*(1_laser*Laser_nm/ma)*LTc2−laser_histor_nm2)*(1-exp(-1*SIDus/LTc2Amp), where laser_histor_nm2 is the prior SID's laser-induced fly height delta for the short time constant; % of laser on during SID is the amount of laser operation from SID-to-SID (not including servo bursts) as a percentage; 1_laser is laser power used during the SID; laser_nm/ma is the laser-induced fly height change at saturation or maximum; LTc2 is the laser-induced fly height change time constant for the short-term temperature model; LTc2_Amp is the time constant amplitude or the portion of the laser-induced fly height change allocated to this model and time constant (where the amplitudes for all models/time constants add up to 1). Temperature model 342.1 may include a short-term time constant 342.2 that determines the time scale on which temperature model 342.1 adjusts the fly height delta and may represent thermal properties of the head that are effectively modeled on that time scale. For example, a short-term temperature model may be configured with short-term time constant 342.2 of 1-10 sectors and substantially less than one revolution. Short-term time constant 342.2 and long-term time constant 340.2 may be configured with a ratio that describes their relative rates of change, such as 2.5, 5, 10, or even greater, so, for example, a ratio of 2.5 means that short-term temperature model 342.1 adjusts 2.5 times faster than long-term temperature model 340.2, even though they may both be updated each sector. In some configurations, fly height compensation temperature model 342.1 may be embodied in firmware equations, a hardware circuit, and/or one or more lookup tables and short-term time constant 340.2 may include a value set by a firmware parameter value, filter/resistor/capacitor values, and/or a parameter value used in the configuration of a lookup table and its index values.

Short-term state machine 342 may determine and store (or otherwise output) a fly height compensation parameter 342.3 corresponding to the short-term temperature compensation state of short-term state machine 342. For example, rather than outputting a temperature state from short-term temperature model 342.1, the output may be determined as a delta fly height compensation value. Short-term state machine 342 may maintain fly height compensation parameter 342.3 in memory and adjust fly height compensation parameter 342.3 each sector based on the delta value output by short-term temperature model 342.1. For example, new current state may equal the prior current state minus the delta value from the temperature model. Fly height compensation parameter 340.3 may be configured to be the value added to the fly height adjustment value determined by fly height state machine 350. For example, an increase in protrusion according to temperature model 342.1 may result in fly height compensation parameter 342.3 going down (in nanometers) to represent a decrease in the amount of fly height compensation that should be generated by fly height state machine 350. Short-term state machine 342 may be configured to pass the current state value for short-term fly height compensation parameter 340.3 to fly height state machine 350 and/or store it in parameter memory 354 for retrieval by fly height state machine 350. In some configurations, a number of fly height compensation parameters for laser-induced temperature compensation models with varying time constants may be summed into a single fly height compensation parameter prior passing or storing.

In some configurations, short-term state machine 342 may be configured with a maximum period of inactivity for the laser, referred to as a time cutoff value 342.4 that effectively resets the model to a default value 342.5, such as zero. For example, short-term state machine 342 may be configured to address thermal characteristics and memory of the head over a relatively short time range (compared to long-term state machine 340) and time cutoff value 342.4 may enforce a return to zero after a period characterized to have an insubstantial amount of fast-response thermal affects. In some configurations, short-term state machine 342 may store the last sector ID during which the laser was used and use SIDs and/or sector/revolution timer 352 to determine an elapsed time since that prior laser use. When the elapsed time meets or exceeds time cutoff value 342.4, the short-term temperature state and/or fly height compensation parameter 342.2 may be set to default value 342.5. In some configurations, each laser-induced temperature state machine may include a time cut-off value, including long-term state machine 340, configured to represent a maximum heat memory characteristic for that model. The time range of the long-term state machine, if not open-ended, would still be longer than the time range for the short-term state machine, so the time range for the long-term state machine would exceed time cutoff value 342.4 of the short-term state machine 342.

In some configurations, multiple laser-induced temperature state machines may be supported by a thermal protrusion model 344. For example, a general laser-induced thermal protrusion model may be characterized for the head and used by each model to determine whether a protrusion state 344.1 is increasing or decreasing relative to the protrusion determined for the prior sector. The temperature state machines may use the direction of a change in protrusion state (increasing or decreasing) to determine whether the sign of their delta value should be positive or negative. In some configurations, the updated and/or delta value protrusion state 344.1 may be used as an input and/or index value for each temperature state model. There may be computational and/or hardware efficiency improvements in separating thermal protrusion model 344 from the temperature state machines, calculating the protrusion state once for each sector, and providing the result to two or more temperature state machines.

Fly height state machine 350 may include a set of functions, parameters, and data structures for determining the overall fly height compensation state for controlling the fly height actuator. For example, fly height state machine 350 may be configured to evaluate one or more state-based parameters for the data storage device and determine, on a feedforward basis, the power signal to be sent to the fly height actuator through fly height power controller 318. Fly height state machine 350 may include a fly height control model 350.1 that associates one or more operating parameters of the data storage device to a desired fly height compensation value (to maintain a predetermined target fly height for the head). For example, fly height control model 350.1 may include a characterization of desired fly height compensation for variations in disk surface (by track, sector, and/or zone), operating modes, and other parameters. Fly height control model 350.1 may determine and update a fly height state 350.2 reflecting the desired fly height compensation, for example, in nanometers. In some configurations, fly height control model 350.1 may be embodied in firmware equations, a hardware circuit, and/or one or more lookup tables.

Fly height state machine 350 may include trigger conditions 350.3 for determining when active fly height control should be engaged and how often fly height state 350.2 should be updated. For example, trigger conditions 350.3 may include a combination of operating mode states, such as corresponding to operating modes 360, and timing, for example, every sector. In some configurations, fly height state machine 350 may determine changes in fly height state 350.2 for each sector, such as responsive to a new servo sector and corresponding SID, during write and read modes and return to zero or another default value during seek or when the head is inactive. Trigger conditions 350.3 may use or be responsive to sector/revolution timer 352 and/or operating modes 360.

Fly height state machine 350 may be configured to translate a desired fly height compensation (e.g., in nanometers) to a fly height power setting 350.4. For example, fly height control model 350.1 may be based on determining fly height state 350.2 in terms of compensation distance and include a mapping or conversion to corresponding power setting values for fly height power controller 318. Fly height power controller 318 may provide an interface that supports a series of input values corresponding to power settings to the fly height actuator and fly height state machine 350 may convert desired fly height state 350.2 for the next sector to fly height power setting 350.4 for fly height power controller 318.

In some configurations, fly height state machine 350 may be based on a number of parameters, including a plurality of fly height compensation parameters determined according to contributing models, such as laser-induced temperature models 340.1 and 342.1. For example, fly height state machine 350 may include a parameter manager 350.5 that receives and/or retrieves one or more fly height compensation parameters generated by other models. In some embodiments, fly height state machine 350 may determine parameters for laser-induced temperature compensation, write pole tip protrusion, one or more temperature sensors, and/or one or more servo values. In some configurations, parameter manager 350.5 may read one or more parameters from parameter memory 354. For example, other state machines and/or components may write their respective compensation values to parameter memory 354 for retrieval as needed by fly height state machine 350. In some configurations, multiple fly height compensation parameters may be summed prior to passing them to fly height control model 350.1 or being directly added to (or subtracted from) fly height state 350.2 prior to determining fly height power setting 350.4. For example, long-term fly height compensation parameter 340.2 and short-term fly height compensation parameter 342.2 may be summed prior to being stored in parameter memory 354 or by fly height state machine 350 when retrieved. In some configurations, parameter memory 354 may include a set of memory locations, registers, or a firmware data structure for storing parameter values used across other components. For example, parameter memory 354 may be a globally defined set of variables and/or a corresponding table or page shared among long-term state machine 340, short-term state machine 342, thermal protrusion model 344, fly height state machine 350, sector/revolution timer 352, operating modes 360, and/or other system components.

Sector/revolution timer 352 may include a set of functions, parameters, and data structures for determining the overall fly height compensation state for controlling the fly height actuator. For example, sector/revolution timer 352 may include an interface with and/or be generated by servo controller 324 based on servo sectors and/or other servo and timing information determined by servo controller 324. In some configurations, sector/revolution timer 352 may indicate per sector and/or per revolution timing and provide one or more counters related to those increments. In some configurations, sector/revolution timer 352 may return a new sector identifier each time a servo sector is read and new sector identifier may be used as a trigger condition for other counters and/or components, such as updated to various state machines.

Operating modes 360 may include a set of interfaces, functions, parameters, and data structures for managing the operating state or states of the actuators, controller, and/or storage device as a whole. Control circuitry 300 may support a number of operating modes at various levels of system or component granularity. In some embodiments, operating modes 370 may include operating modes on a per head basis (and/or per actuator basis in multi-actuator systems). In some configurations, operating modes may include: spin up, start up, seek, write, read, active, multiple idle modes, and multiple standby modes. For example, spin up and start up may include a series of actions to prepare the mechanics and electronics of the storage device to reach a ready state. Seek 360.1, laser-assisted write 360.2, and read 360.3 may correspond to storage command operating modes for each type of operation. Active may be a ready state for immediate execution of one the storage command operating modes and various idle and standby modes may include various power saving and reduced operating modes. In some configurations, laser operating modes may also be tracked by operating modes 360 and/or may be inferred from laser-assisted write 360.2. Various state machines and models, including long-term state machine 340, short-term state machine 342, thermal protrusion model 344, and fly height state machine 350 may use operating modes 360 as input parameters. For example, periods spent in laser-assisted write 360.2 may be used to determine whether the laser is operating and, if so, the amount it is operating (such as a percentage of the sector spent in laser-assisted write mode as opposed to read, seek, or another mode).

Figure 4A:
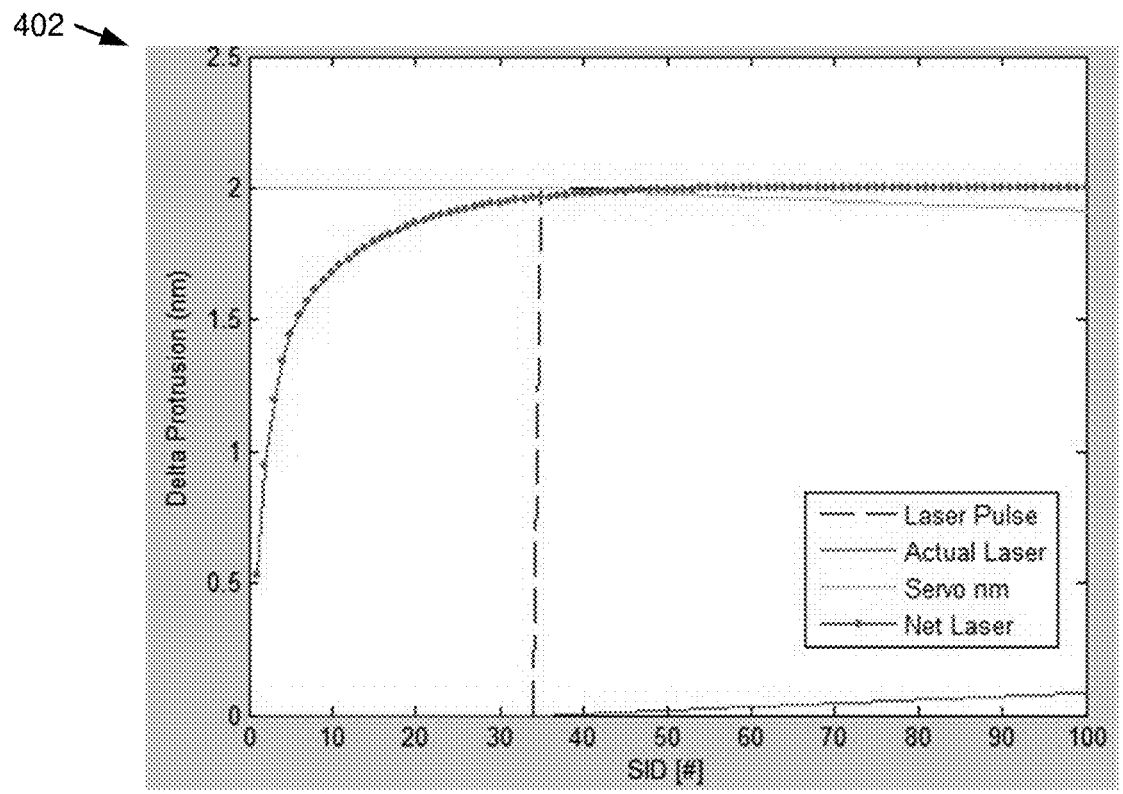
FIG. 4A is an example graph of laser-induced delta protrusion on a short time scale.
Figure 4B:
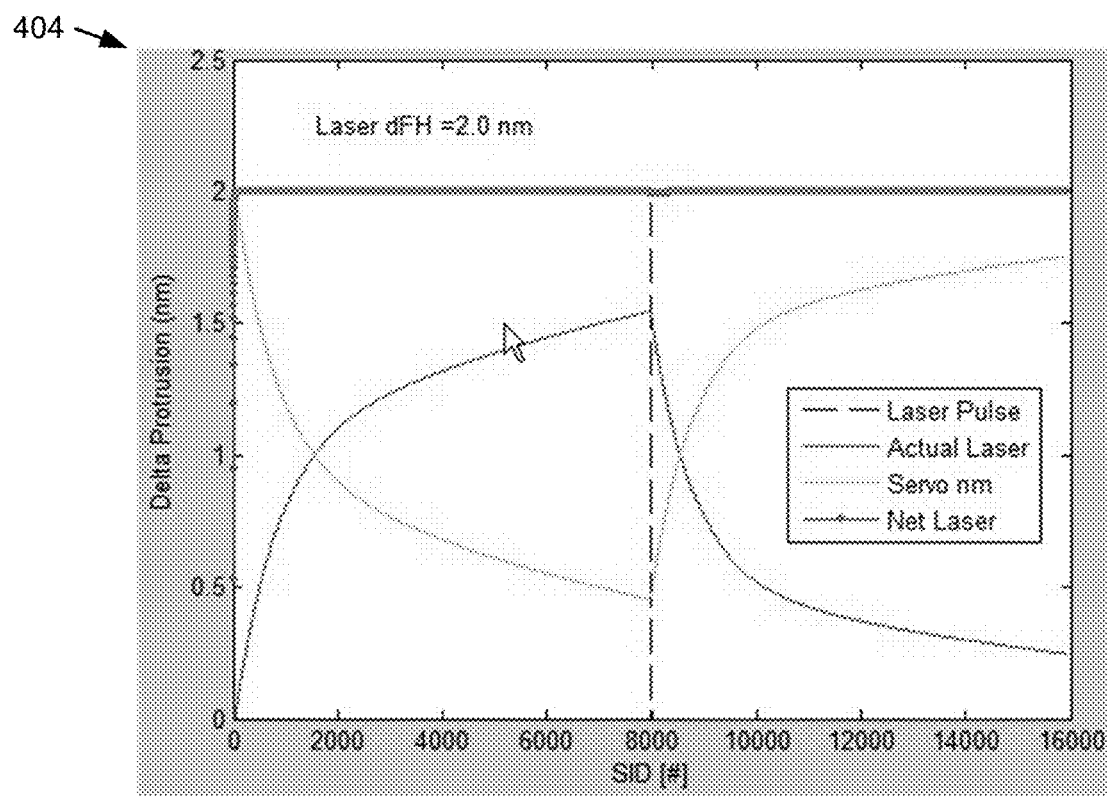
FIG. 4B is an example graph of laser-induced delta protrusion on a long time scale.

FIGS. 4A and 4B show graphs 402 and 404 of an example laser-induced change in protrusion over two different time scales. Time is on the x-axis and expressed in SID or number of sectors. Delta protrusion (change in fly height) is on the y-axis and shows a total variation in fly height attributable to laser heating of 2 nanometers. In FIG. 4A, the change in fly height based on a first laser pulse is shown on a relatively short timescale of 100 sectors, showing a rapid onset of fly height change over the first forty sectors. In FIG. 4B, the long-term heating affects are shown over multiple revolutions (e.g., ~600 sectors), as well as the way an inverse compensation (Servo nm) may be used to maintain a more consistent fly height.

Figure 5:
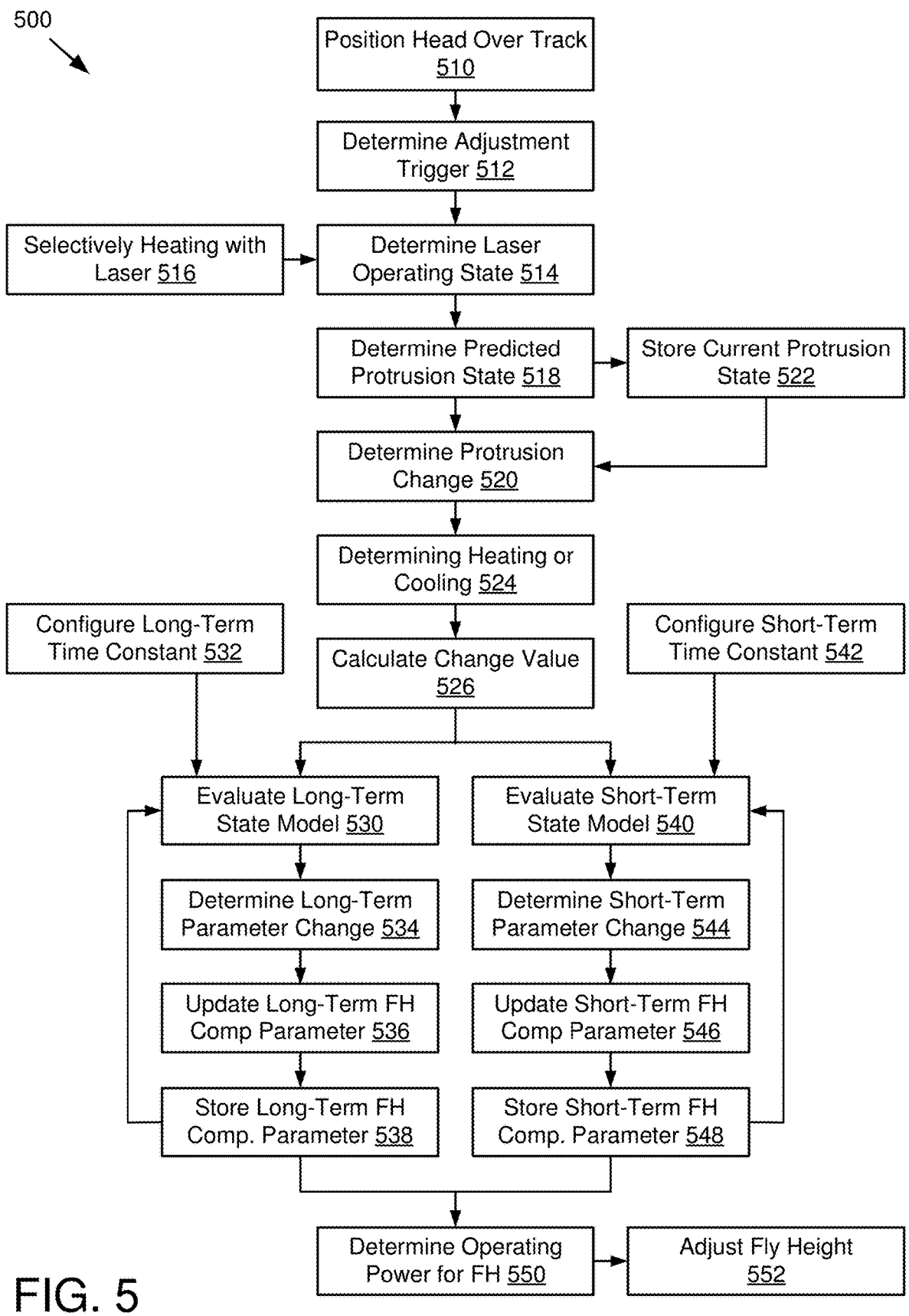
FIG. 5 is another example method of adjusting fly height based on short-term and long-term laser-induced temperature compensation.

As shown in FIG. 5, control circuitry 300 may be operated according to an example method of adjusting fly height based on short-term and long-term laser-induced temperature compensation, i.e., according to the method 500 illustrated by blocks 510-552.

At block 510, a head is positioned over a track. For example, responsive to one or more storage commands, a servo controller may position a HAMR head over a target track for one or more operations.

At block 512, an adjustment trigger may be determined. For example, a fly height state machine and one or more supporting state machines may be configured to update on a per sector basis and a new sector may be identified.

At block 514, a laser operating state may be determined. For example, based on the operations to be executed in the next sector, one or more state machines may determine the number, percentage, or other quantification of whether and/or how much the laser is active to heat in the next sector.

At block 516, the laser may selectively heat the storage medium. For example, during laser-assisted write operations, laser pulses may be used to heat the storage medium ahead of the write element in the vicinity of the write operation.

At block 518, a predicted protrusion state may be determined. For example, a laser-induced thermal protrusion model may calculate a predicted laser-induced protrusion state value in nanometers.

At block 520, a protrusion change may be determined. For example, the laser-induced thermal protrusion model may compare the predicted laser-induced protrusion state value from block 518 to a previously calculated laser-induced protrusion state value, such as the state value from the prior sector.

At block 522, the current (predicted) protrusion state may be stored. For example, once the predicted protrusion state value is calculated at block 518, the laser-induced thermal protrusion model may store the predicted protrusion state value in memory as the current protrusion state value for use (during the next sector update) in determining the protrusion change at block 520.

At block 524, heating or cooling may be determined. For example, based on the change in laser-induced protrusion delta value determined at block 520, the laser-induced thermal protrusion model may determine whether the change determined at block 520 corresponds to heating or cooling of the head.

At block 526, the protrusion change value may be determined. For example, based on the laser-induced protrusion delta value determined at block 520, the laser-induced thermal protrusion model may determine a magnitude of the change in nanometers. In some configurations, the direction (heating or cooling) and magnitude of the delta value may be passed to both a long-term laser-induced temperature compensation state machine and a short-term laser-induced temperature compensation state machine as heating change values or cooling change values.

At block 530, a long-term temperature state model may be evaluated. For example, the long-term state machine may evaluate a long-term temperature state model based on the amount of laser operation in the coming sector and a previously determined long-term fly height compensation state value.

At block 532, a long-term time constant may be configured for the long-term temperature state model. For example, at system characterization and configuration, the storage device designer may determine an appropriate long-term time constant frequency value (determining how quickly the long-term temperature state model changes) and amplitude (determining how much of the laser-induced thermal load is attributed to the long-term temperature state model, as opposed to other concurrent temperature models, such as a short-term temperature state model) and set them as parameters of the long-term temperature state model.

At block 534, a long-term fly height compensation parameter change may be determined. For example, evaluation of the long-term temperature state model at block 530 may determine a delta value for the long-term fly height compensation parameter.

At block 536, the long-term fly height compensation parameter may be updated. For example, based on the delta value from block 534, the long-term state machine may update the fly height compensation parameter value for the coming sector operations.

At block 538, the long-term fly height compensation parameter may be stored. For example, the long-term state machine may store the updated fly height compensation parameter value to parameter memory accessible by the fly height state machine.

At block 540, a short-term temperature state model may be evaluated. For example, the short-term state machine may evaluate a short-term temperature state model based on the amount of laser operation in the coming sector and a previously determined short-term fly height compensation state value.

At block 542, a short-term time constant may be configured for the short-term temperature state model. For example, at system characterization and configuration, the storage device designer may determine an appropriate short-term time constant frequency value (determining how quickly the short-term temperature state model changes) and amplitude (determining how much of the laser-induced thermal load is attributed to the short-term temperature state model, as opposed to other concurrent temperature models, such as the long-term temperature state model) and set them as parameters of the short-term temperature state model.

At block 544, a short-term fly height compensation parameter change may be determined. For example, evaluation of the short-term temperature state model at block 530 may determine a delta value for the short-term fly height compensation parameter.

At block 546, the short-term fly height compensation parameter may be updated. For example, based on the delta value from block 534, the short-term state machine may update the fly height compensation parameter value for the coming sector operations.

At block 548, the short-term fly height compensation parameter may be stored. For example, the short-term state machine may store the updated fly height compensation parameter value to parameter memory accessible by the fly height state machine.

At block 550, operating power for the fly height actuator may be determined. For example, based on a sum of the long-term fly height compensation parameter and the short-term fly height compensation parameter, the fly height state machine may update the fly height compensation state and use it to index the power setting for a fly height power controller that controls the power to the fly height actuator.

At block 552, the fly height is adjusted. For example, the fly height actuator may change its level of actuation based on the power signal received to maintain or change the actual and/or desired fly height of the head.

Figure 6:
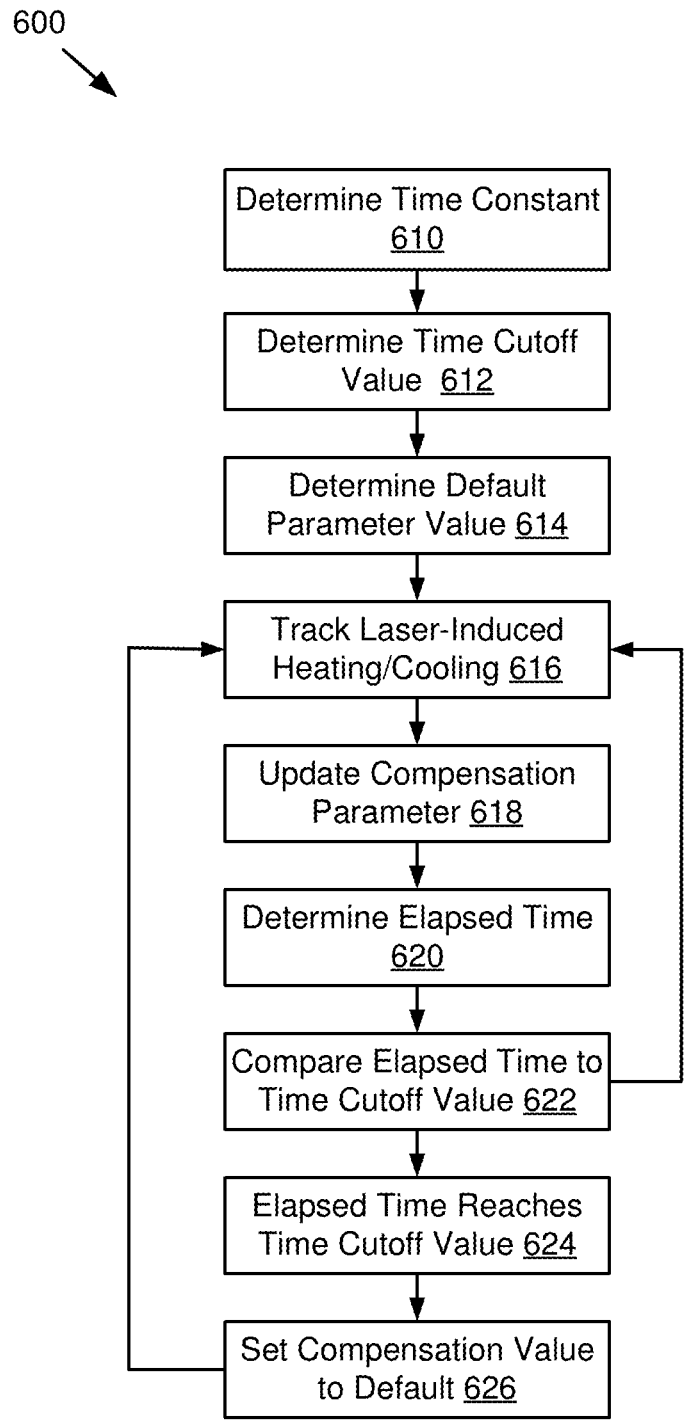
FIG. 6 is an example method of using a time cutoff value for the short-term laser-induced temperature compensation state.

As shown in FIG. 6, control circuitry 300 may be operated according to an example method of using a time cutoff value for the short-term laser-induced temperature compensation state, i.e., according to the method 600 illustrated by blocks 610-626.

At block 610, a time constant may be determined for a temperature compensation state machine. For example, at system characterization and configuration, the storage device designer may determine an appropriate short-term time constant value reflecting the rate of change of the thermal characteristics being modeled and set it as a parameter of the short-term temperature state model.

At block 612, a time cutoff value may be determined. For example, at system characterization and configuration, the storage device designer may determine an appropriate time cutoff value reflecting a maximum thermal memory being modeled and set it as a parameter of the short-term temperature state model.

At block 614, a default parameter value may be determined. For example, at system characterization and configuration, the storage device designer may determine an appropriate default parameter value that the model returns to (and starts from) and set it as a parameter of the short-term temperature state model. At runtime, the values from blocks 610-614 may be determined from configuration memory for the model or be inherent in the hardware configuration for the model.

At block 616, laser induced heating and cooling may be tracked. For example, the short-term temperature state model may include both heating and cooling logic and parameters, which are selectively evaluated by the short-term state machine for each sector, depending on whether protrusion is increasing or decreasing.

At block 618, the compensation parameter may be updated. For example, the short-term state machine may update the laser-induced fly height compensation parameter value for each sector.

At block 620, an elapsed time since the last use of the laser may be determined. For example, the short-term state machine may count sectors since the last sector during which the laser was used.

At block 622, the elapsed time may be compared to the time cutoff value. For example, the short-term state machine may compare the sector count to the time cutoff value (in sectors). If the elapsed time is less than the time cutoff value, method 600 may return to block 616.

At block 624, the elapsed time may reach the time cutoff value. For example, the short-term state machine may determine that the elapsed time meets or exceeds the time cutoff value.

At block 626, the compensation parameter value may be set to the default. For example, the short-term state machine may return the fly height compensation value to the default value for the next sector and use that default value as the current state for the next iteration of the state machine.

Figure 7:
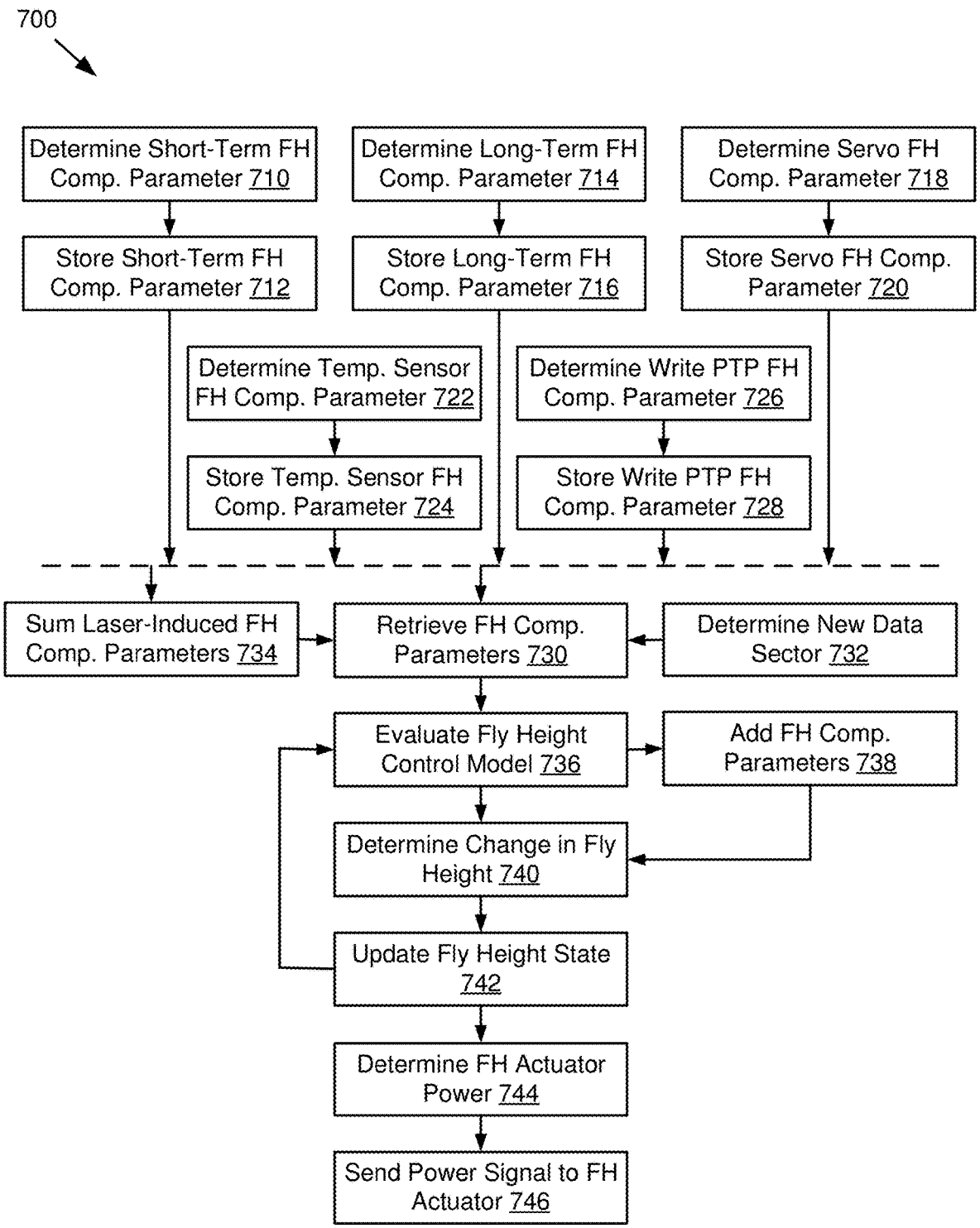
FIG. 7 is an example method of adjusting fly height based on a plurality of parameters.

As shown in FIG. 7, control circuitry 300 may be operated according to an example method of adjusting fly height based on a plurality of parameters, i.e., according to the method 700 illustrated by blocks 710-744. The selected parameters are examples only and any number of parameters, including parameters not identified herein, that impact fly height may be used.

At block 710, a short-term fly height compensation parameter may be determined and, at block 712, the fly height compensation parameter may be stored. For example, a short-term laser-induced temperature compensation state machine may generate a corresponding fly height compensation parameter and store it in parameter memory.

At block 714, a long-term fly height compensation parameter may be determined and, at block 716, the fly height compensation parameter may be stored. For example, a long-term laser-induced temperature compensation state machine may generate a corresponding fly height compensation parameter and store it in parameter memory.

At block 718, a servo-based fly height compensation parameter may be determined and, at block 720, the fly height compensation parameter may be stored. For example, a servo-based fly height compensation state machine may generate a corresponding fly height compensation parameter based on one or more servo signal values or related parameters and store it in parameter memory.

At block 722, a temperature sensor fly height compensation parameter may be determined and, at block 724, the fly height compensation parameter may be stored. For example, a sensor-based temperature compensation state machine may generate a corresponding fly height compensation parameter for a data storage device temperature state based on a signal from one or more temperature sensors and store it in parameter memory.

At block 726, a write pole tip protrusion (PTP) fly height compensation parameter may be determined and, at block 728, the fly height compensation parameter may be stored. For example, a write PTP compensation state machine may generate a corresponding fly height compensation parameter based on the pole tip protrusion state (in nanometers) from write operations and store it in parameter memory.

At block 730, fly height compensation parameters may be retrieved. For example, a fly height state machine may read the relevant set of fly height compensation parameters from the parameter memory, such as laser-induced fly height compensation parameters and any additional fly height compensation parameters from blocks 718-728.

At block 732, a new data sector may be determined. For example, retrieval of fly height compensation parameters at block 730 may be triggered by a new sector where the fly height is updated on a per sector basis.

At block 734, laser-induced fly height compensation parameters may be summed. For example, the fly height compensation parameters from multiple laser-induced temperature models may be summed into a single fly height compensation parameter value. In some configurations, other fly height compensation parameters may be expressed in fly height delta values and may be similarly summed for use by the fly height state machine.

At block 736, a fly height control model may be evaluated. For example, the fly height state machine may include a fly height control model based on one or more operating parameters of the data storage device other than those being added through fly height compensation parameter values.

At block 738, fly height compensation parameters may be added. For example, the fly height state machine may add one or more fly height compensation parameter values to the fly height compensation state value generated at block 736.

At block 740, a change in fly height may be determined. For example, the fly height state machine may determine that the fly height compensation state value generated at blocks 736 or 738 may be different than a prior fly height compensation state and require adjustment of the fly height actuator.

At block 742, the fly height state may be updated. For example, the fly height state machine may update the fly height compensation state value to represent the predicted fly height compensation needed for the next sector (and to use as the current state for the next iteration of the state machine).

At block 744, fly height actuator power may be determined. For example, the fly height state machine may map the fly height compensation state value to a fly height actuator power setting.

At block 746, a power signal may be sent to the fly height actuator. For example, the fly height state machine may send the fly height actuator power setting to a fly height power controller that sends the power signal to the fly height actuator in the head.

Technology for improved fly height compensation in HAMR data storage devices using multiple time constants in laser-induced temperature modeling is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
a non-volatile storage medium comprising a plurality of data tracks;
a head actuated over the non-volatile storage medium, wherein the head comprises:
a laser configured to heat the non-volatile storage medium while writing data to the non-volatile storage medium; and
a fly height actuator configured to adjust a fly height of the head over the non-volatile storage medium; and
control circuitry configured to:
position the head over a target track of the plurality of data tracks;
determine, based on operation of the laser, a first fly height compensation parameter corresponding to a first temperature state model, wherein the first temperature state model is configured to track laser-induced heating in a first time range below a time cutoff value;
determine, based on the operation of the laser, a second fly height compensation parameter corresponding to a second temperature state model, the second temperature state model is configured to track laser-induced heating in a second time range that extends above the time cutoff value; and
determine, based on the first fly height compensation parameter and the second fly height compensation parameter, operating power of the fly height actuator.

2. The data storage device of claim 1, wherein:
the non-volatile storage medium comprises a rotating disk; and
the time cutoff value is not greater than one revolution of the rotating disk.

3. The data storage device of claim 1, wherein the first temperature state model is further configured to:
determine an elapsed time since the laser was active; and
responsive to the elapsed time reaching the time cutoff value, set the first fly height compensation parameter to a default value.

4. The data storage device of claim 1, wherein:
the first temperature state model includes a first time constant configured to determine changes in the first fly height compensation parameter;
the second temperature state model includes a second time constant configured to determine changes in the second fly height compensation parameter; and
the first time constant is less than the second time constant.

5. The data storage device of claim 4, wherein the second time constant is at least twice the first time constant.

6. The data storage device of claim 1, wherein:
the control circuitry is further configured to evaluate a fly height control model to determine the operating power of the fly height actuator;
the fly height control model is based on a plurality of fly height compensation parameters; and
the plurality of fly height compensation parameters comprises:
the first fly height compensation parameter for laser-induced heating; and
the second fly height compensation parameter for laser-induced heating.

7. The data storage device of claim 6, wherein:
the control circuitry is further configured to determine at least one additional fly height compensation parameter of the plurality of fly height compensation parameters; and
the at least one additional fly height compensation parameters is selected from:
a servo signal value;
a data storage device temperature state; and
write pole tip protrusion state.

8. The data storage device of claim 1, wherein:
the plurality of data tracks is comprised of a plurality of data sectors; and
the control circuitry is further configured to update the first fly height compensation parameter and the second fly height compensation parameter on a per data sector basis.

9. The data storage device of claim 1, wherein the control circuitry is further configured to:
determine whether the laser is active to heat the non-volatile storage medium;
responsive to the laser being active to heat the non-volatile storage medium, determine whether laser-induced protrusion is greater than a current protrusion value;
responsive to the laser-induced protrusion being greater than the current protrusion value:
selectively calculate, using the first temperature state model, a first heating change value;
selectively update, based on the first heating change value, the first fly height compensation parameter;
selectively calculate, using the second temperature state model, a second heating change value; and
selectively update, based on the second heating change value, the second fly height compensation parameter; and
responsive to the laser-induced protrusion being less than the current protrusion value:
selectively calculate, using the first temperature state model, a first cooling change value;
selectively update, based on the first cooling change value, the first fly height compensation parameter;
selectively calculate, using the second temperature state model, a second cooling change value; and selectively update, based on the second cooling change value, the second fly height compensation parameter.

10. The data storage device of claim 1, wherein the control circuitry is further configured to:
determine whether the laser is not active to heat the non-volatile storage medium; and
responsive to the laser not being active to heat the non-volatile storage medium:
selectively calculate, using the first temperature state model, a first cooling change value;
selectively update, based on the first cooling change value, the first fly height compensation parameter;
selectively calculate, using the second temperature state model, a second cooling change value; and
selectively update, based on the second cooling change value, the second fly height compensation parameter.

11. A method comprising:
positioning a head over a target track of a plurality of data tracks on a non-volatile storage medium;
selectively heating, using a laser in the head, the non-volatile storage medium while writing data to the non-volatile storage medium; and
adjusting, using a fly height actuator, a fly height of the head over the non-volatile storage medium;
determining, based on operation of the laser, a first fly height compensation parameter corresponding to a first temperature state model;
determining, based on the operation of the laser, a second fly height compensation parameter corresponding to a second temperature state model;
determining, using a first time constant for the first temperature state model, changes in the first fly height compensation parameter;
determining, using a second time constant for the second temperature state model, changes in the second fly height compensation parameter, wherein the first time constant is less than the second time constant; and
determining, based on the first fly height compensation parameter and the second fly height compensation parameter, operating power of the fly height actuator to adjust the fly height.

12. The method of claim 11, further comprising:
tracking, using the first temperature state model, laser-induced heating in a first time range below a time cutoff value; and
tracking, using the second temperature state model, laser-induced heating in a second time range that extends above the time cutoff value.

13. The method of claim 12, further comprising:
determining, for the first temperature state model, an elapsed time since the laser was active; and
responsive to the elapsed time reaching the time cutoff value, setting the first fly height compensation parameter to a default value.

14. The method of claim 12, wherein:
the non-volatile storage medium comprises a rotating disk; and
the time cutoff value is not greater than one revolution of the rotating disk.

15. The method of claim 11, further comprising:
determining at least one additional fly height compensation parameter selected from:
a servo signal value;
a data storage device temperature state; and
write pole tip protrusion state; and evaluating a fly height control model to determine the operating power of the fly height actuator, wherein the fly height control model is based on at least:
the first fly height compensation parameter for laser-induced heating;
the second fly height compensation parameter for laser-induced heating; and
the at least one additional fly height compensation parameter.

16. The method of claim 11, further comprising:
updating the first fly height compensation parameter and the second fly height compensation parameter on a per data sector basis, wherein the plurality of data tracks is comprised of a plurality of data sectors.

17. The method of claim 11, further comprising:
determining whether the laser is active to heat the non-volatile storage medium;
responsive to the laser being active to heat the non-volatile storage medium, determining whether laser-induced protrusion is greater than a current protrusion value;
responsive to the laser-induced protrusion being greater than the current protrusion value:
selectively calculating, using the first temperature state model, a first heating change value;
selectively updating, based on the first heating change value, the first fly height compensation parameter;
selectively calculating, using the second temperature state model, a second heating change value; and
selectively updating, based on the second heating change value, the second fly height compensation parameter; and
responsive to the laser-induced protrusion being less than the current protrusion value:
selectively calculating, using the first temperature state model, a first cooling change value;
selectively updating, based on the first cooling change value, the first fly height compensation parameter;
selectively calculating, using the second temperature state model, a second cooling change value; and
selectively updating, based on the second cooling change value, the second fly height compensation parameter.

18. The method of claim 11, further comprising:
determining whether the laser is not active to heat the non-volatile storage medium; and
responsive to the laser not being active to heat the non-volatile storage medium:
selectively calculating, using the first temperature state model, a first cooling change value;
selectively updating, based on the first cooling change value, the first fly height compensation parameter;
selectively calculating, using the second temperature state model, a second cooling change value; and
selectively updating, based on the second cooling change value, the second fly height compensation parameter.

19. A data storage device comprising:
a non-volatile storage medium comprising a plurality of data tracks;
a head actuated over the non-volatile storage medium, wherein the head comprises:
a laser configured to heat the non-volatile storage medium while writing data to the non-volatile storage medium; and
a fly height actuator configured to adjust a fly height of the head over the non-volatile storage medium;

means for positioning the head over a target track of the plurality of data tracks;

means for determining, based on operation of the laser, a first fly height compensation parameter corresponding to a first temperature state model;

means for determining, based on the operation of the laser, a second fly height compensation parameter corresponding to a second temperature state model; and means for determining, based on the first fly height compensation parameter and the second fly height compensation parameter, operating power of the fly height actuator.

20. The method of claim 11, wherein the second time constant is at least twice the first time constant.

\* \* \* \* \*